US012783599B2

(12) United States Patent
Geluk et al.

(10) Patent No.: US 12,783,599 B2
(45) Date of Patent: Nov. 3, 2026

(54) COMPUTER IMPLEMENTED METHOD OF DETERMINING A TRANSFER FUNCTION OF A MODULE OR A COMPONENT AND GENERATING SUCH COMPONENT

(71) Applicant: Siemens Industry Software NV, Leuven (BE)

(72) Inventors: Theo Geluk, Tholen (NL); Shuhei Yamada, Leuven (BE)

(73) Assignee: Siemens Industry Software NV, Leuven (BE)

(*) Notice: Subject to any disclaimer, the term of this patent is extended or adjusted under 35 U.S.C. 154(b) by 407 days.

(21) Appl. No.: 18/559,731

(22) PCT Filed: Apr. 4, 2022

(86) PCT No.: PCT/EP2022/058850

§ 371 (c)(1),
(2) Date: Nov. 8, 2023

(87) PCT Pub. No.: WO2022/238048

PCT Pub. Date: Nov. 17, 2022

(65) Prior Publication Data

US 2024/0248953 A1 Jul. 25, 2024

(30) Foreign Application Priority Data

May 11, 2021 (EP) .................................... 21173273

(51) Int. Cl.
*G06F 17/16* (2006.01)

(52) U.S. Cl.
CPC .................................... *G06F 17/16* (2013.01)

(58) Field of Classification Search
CPC ......... G06F 17/16; G06F 17/11; G01M 7/025
See application file for complete search history.

(56) References Cited

U.S. PATENT DOCUMENTS

2008/0046214 A1* 2/2008 Fowler .................. G01C 17/00 702/150
2016/0226468 A1* 8/2016 Ge .......................... G06F 17/16
(Continued)

OTHER PUBLICATIONS

Ait Rimouch H et al: "A contribution to the resolution of structural dynamics problems using frequency response function matrix"; J. Mater. Environ. Sci; vol. 9; No. 9, 2018; pp. 2558-2566.
(Continued)

*Primary Examiner* — Ricky Go
(74) *Attorney, Agent, or Firm* — Lempia Summerfield Katz LLC

(57) ABSTRACT

A computer implemented method of determining a transfer function (TRF) of a module (MDL). To improve an accuracy, the method includes measuring a first set-of-sensors-output (SO1) applied to the module (MDL) and measuring a second set-of-sensors-output (SO2), deducing a transfer function (TRF) of the module (MDL), wherein a transfer-function matrix (MTM) is a quadratic n-dimensional matrix for the n degrees of freedom (DOF), selecting a submatrix (SBM), determining for the selected submatrix (SBM) a corresponding rotational matrix (RTM) which improves the symmetry of the submatrix (SBM), generating a main rotational matrix (MRM) to transform the main transfer-function matrix (MTM), and providing the transfer function (TRF) with the transformed transfer-function matrix (TTM).

10 Claims, 8 Drawing Sheets

(56) References Cited

U.S. PATENT DOCUMENTS

| | | | | |
|---|---|---|---|---|
| 2022/0148607 | A1* | 5/2022 | Ragot | G10L 19/008 |
| 2022/0159402 | A1* | 5/2022 | Magariyachi | H04S 7/304 |

OTHER PUBLICATIONS

Cuppens, Koen, Paul Sas, and L. Hermans. "Evaluation of the FRF based substructuring and modal synthesis technique applied to vehicle FE data." Proceedings of the International seminar on modal analysis. vol. 3. KU Leuven; 1998, 2001. pp. 1143-1150.

Jagadish, Chirag, and Bor-Chin Chang. "Diversified redundancy in the measurement of Euler angles using accelerometers and magnetometers." 2007 46th IEEE Conference on Decision and Control. IEEE, 2007. pp. 2669-2674.

Ortega Almirón, Jesús, et al. "Road Noise assessment using component-based TPA for a tire assembly." International Congress: SIA-CTTM Automotive NVH Comfort-Quietness Mobility of the Future . . . SIA, 2018.pp. 1-7.

PCT International Search Report and Written Opinion of International Searching Authority mailed Jul. 5, 2022 corresponding to PCT International Application No. PCT/EP2022/058850.

Venugopal, Harikrishnan. "Component-Based Transfer Path Analysis and Hybrid Substructuring at high frequencies: A treatise on error modelling in Transfer Path Analysis." (2020). pp. 1-110.

* cited by examiner

CPS, CRM
a.
b.
MDL
SO1
SS1
SS2
SO2
$H(\omega) = [K - \omega^2 M]^{-1}$
DOF, NDM
1x''' 1y''' 2x''' 2y'''
1x' 1y' 2x'' 2y''
H1'''1'
H1'''2''
H2'''1'
H2'''2''
TRF
MTM
SBM
SBM
LOD
MES
CSY
SBM1
SBM2

$$H_C = \begin{bmatrix} H_{A_{aa}} & H_{A_{ac}} & 0 \\ H_{A_{ca}} & H_{A_{cc}} & 0 \\ 0 & 0 & H_{B_{bb}} \end{bmatrix} - \begin{bmatrix} H_{A_{ac}} \\ H_{A_{cc}} \\ -H_{B_{bc}} \end{bmatrix} \left[ H_{A_{cc}} + H_{B_{cc}} \right]^{-1} \begin{bmatrix} H_{A_{ca}} \\ H_{A_{cc}} \\ -H_{B_{cb}} \end{bmatrix}^{T}$$

A
I
B
II
CPS, CRM
a.
b.
MDL
SO1
SS1
SS2
SO2
$\underline{H}(\omega) = [\underline{K} - \omega^2\underline{M}]^{-1}$
TRF
DOF, NDM
1x' 1y' 2x'' 2y''
1x''' 1y''' 2x''' 2y'''
$H_{1'''1'}$ $H_{1'''2''}$ $H_{2'''1'}$ $H_{2'''2''}$
MTM
SBM
SBM
LOD
MES
CSY
SBM1
SBM2

COMPUTER IMPLEMENTED METHOD OF DETERMINING A TRANSFER FUNCTION OF A MODULE OR A COMPONENT AND GENERATING SUCH COMPONENT

CROSS REFERENCE TO RELATED APPLICATIONS

This present patent document is a § 371 nationalization of PCT Application Serial Number PCT/EP2022/058850, filed Apr. 4, 2022, designating the United States which is hereby incorporated in its entirety by reference. This patent document also claims the benefit of EP21173273.0 filed on May 11, 2021, which is hereby incorporated in its entirety by reference.

FIELD

Embodiments relate to determining transfer functions—for example frequency response functions—of modules of a component and of the component itself.

BACKGROUND

Frequency Based Substructuring (FBS)—also called dynamic substructuring—is a method widely used in the industry for assembling module transfer functions, more specifically Frequency Response Functions (FRFs) to determine the complete component's dynamic behavior. Its advantages include: enabling rapid evaluation of the complete dynamic behavior of the component when changing individual modules, allowing for a faster design cycle, combining analytical/numerical model with measured module FRFs for hybrid analysis, convenient workaround if a component/module is difficult to measure.

Most methods devised for FBS require matrix inversion of the measured FRF matrices which are involved in the coupling of individual modules.

The general expression of a FRF matrix referring to a steady state response to a harmonic excitation of an undamped multi-degree-of-freedom system may be written as:

$$\underline{M}\ddot{\underline{q}} + \underline{K}\dot{\underline{q}} = \underline{Q}(t)$$

Assuming harmonic excitation and response:

$$\underline{Q}(t) = \mathrm{Re}\{\hat{Q}\,e^{j\omega t}\}$$
$$\underline{q}(t) = \mathrm{Re}\{\hat{q}\,e^{j\omega t}\}$$

With: M=matrix of mass; K=matrix of stiffness; Q,q=force, motion.

The FRF-matrix describes the system's behavior as a response to an excitation:

$$\underline{H}(\omega) = \left[\underline{K} - \omega^2\underline{M}\right]^{-1}$$

As errors to the FRF introduced by motion and force measurement propagate during FBS, these errors become a major obstacle to obtaining accurate results.

Conventionally, solutions to the accuracy problems resulting from measurement inaccuracies being amplified by post measurement processing include the following approaches. Averaging of upper and lower triangle of the FRF coupling matrices results in reciprocal coupling terms in the FRF matrix. This may suppress inversion problems, but it does not fundamentally solve the reason why upper and lower triangle components in the FRF matrix are non-reciprocal. The result may still be error prone, as the averaging result is fully dependent on the 'errors' made in either the upper or the lower triangle matrix. Removal of non-reciprocal terms in the coupling matrix may—as above—stabilize the inversion but does not solve the underlying problem. Fitting a model through the measured transfer function and imposing reciprocal behavior on this model to synthesize a reciprocal coupling matrix. As above, this may stabilize the inversion, but fully maintains the errors present in the coupling matrix. The coupling results are unlikely to be improved. From "Evaluation of the FRF based substructuring and modal synthesis technique applied to vehicle FE data, January 2000, K. Cuppens, P. Sas, L. Hermans" a fundamental FRF based substructuring methodology is known. "Road Noise assessment using component-based TPA for a tire, 2018, F. Bianciardi, J. Ortega Almiron, E. Risaliti, P. Corbeels" is a more recent reference on using FBS in context of component transfer path analysis (TPA) aiming to maximize the coupling quality. Further, Euler angle identification is done in literature, for example involving inertial measurement units (DC accelerometers, gyroscopes, magnetometers). This is known from e.g., "Diversified redundancy in the measurement of Euler angles using accelerometers and magnetometers, 2007, Chirag Jagadish; Bor-Chin Chang". Structural dynamics problem analysis using frequency response function matrix is known from Ait Rimouch H. et al "A contribution to the resolution of structural dynamics problems using frequency response function matrix", J. MATER. ENVIRON. SCI, vol. 9, no. 9, 2018, pages 2558-2566, XP055856432, ISSN: 2028-2508. Using component-based TPA for a tire assembly is known from Bianciardi Fabio et al "Road Noise assessment using component-based TPA for a tire assembly", Conference paper, 1 Oct. 2018 (Oct. 1, 2018), pages 1-7, XP055856429. Component-Based Transfer Path Analysis and Hybrid Substructuring is known from Venugopal Harikrishnan et al: "Component-Based Transfer Path Analysis and Hybrid Substructuring at high frequencies", DEGREE PROJECT IN INDUSTRIAL ENGINEERING AND MANAGEMENT, 5 Oct. 2020 (Oct. 5, 2020), pages 1-110, XP055854340, STOCKHOLM, SWEDEN. Using frequency response function matrices to solve structural dynamics problems is known from Hammou Ait Rimouch et al: "A contribution to the resolution of structural dynamics problems using frequency response function matrix", J. MATER. ENVIRON. SCI, vol. 9, no. 9 2018, pages 2558-2566, XP055856432, ISSN: 2028-2508.

BRIEF DESCRIPTION AND SUMMARY

The scope of the embodiments is defined solely by the appended claims and is not affected to any degree by the statements within this summary. The present embodiments may obviate one or more of the drawbacks or limitations in the related art.

Embodiments improve the accuracy of module FRFs and the accuracy of FBS and to finally improve the quality of component FRF generated on basis of these procedures.

To avoid the above referenced problems of inaccuracy, embodiments provide a method including: a) measuring a first set-of-sensors-output (SO1) using a first set-of-sensors (SS1) applied to the module (MDL) and measuring a second set-of-sensors-output (SO2) using a second set-of-sensors (SS2) applied to the module (MDL), b) deducing a transfer function (TRF) with a main transfer-function matrix (MTM) of the module (MDL) on basis of the set-of-sensors-outputs (SO2, SO1), wherein the transfer-function matrix (MTM) is a quadratic n-dimensional matrix for the n degrees of freedom (DOF), wherein each degree of freedom (DOF) is assigned to a specific one of the n dimensions (NDM), c) selecting a submatrix (SBM) either as the complete main transfer-function matrix (MTM) or subdividing the transfer-function matrix (TRM) in at least two submatrices (SBM) each being assigned to a specific range of the degrees of freedom (DOF) and selecting one of these submatrices (SBM), d) determining for the selected submatrix (SBM) a corresponding rotational matrix (RTM) which improves the symmetry of the submatrix (SBM), e) generating a main rotational matrix (MRM) to transform the main transfer-function matrix (MTM), wherein the main rotational matrix (MRM) includes the rotational matrix (RTM) such that the range of the degrees of freedom (DOF) of the respective submatrix (SBM) corresponds to the rotational submatrix (RTM) and transforms the corresponding degrees of freedom (DOF) in the main transfer-function matrix (MTM) into a transformed transfer-function matrix (TTM), and f) providing the transfer function (TRF) with the transformed transfer-function matrix (TTM) substituting the main transfer-function matrix (MTM).

The first set of sensors may be one of a piezo-electric sensor, or strain-gauge sensor or the like. These sensors are for measuring a force-parameter.

The second set of sensors may be at least one of ceramic piezoelectric sensor, an accelerometer, an optical vibrometer, or the like for measuring vibration (for example 3 degree of freedom vibrational responses). The accelerometer may be a sensor that measures the dynamic acceleration of a physical device as a voltage. Using optical laser probes may be advantageous when having light structure devices or in case of problems physically contacting the device.

It is known in prior art to modify a matrix, and this may be done to change symmetry features of a submatrix. A person with ordinary skill in the art is able to determine a corresponding transformation which improves the symmetry of the submatrix.

Embodiments provide a computer implemented method of coupling two modules that are sub-structures of a component including determining a transfer function of both of the modules applying a method according to the steps a.-f. as defined above, including the additional step of combining the single transfer functions of both modules obtaining a combined transfer function. The benefit in this process is better understood when considering that combining (known practice of FBS) the single transfer functions involves a matrix inversion (inversion of a matrix including elements of transfer functions of both modules) which leads to error-amplification. Embodiments therefore provide an application of FBS with a higher accuracy.

The module may be any kind of component feasible to be assumed as a rigid body. The module is to be assumed to be a rigid body by a skilled artisan considering the respective circumstances underlying the analysis.

The process also relies on some basic linear algebra facts, like: a symmetric matrix is a square matrix that is equal to its transpose. Further, every square real matrix may be written as a product of two real symmetric matrices, and every square complex matrix may be written as a product of two complex symmetric matrices (Jordan normal form), that every real non-singular matrix may be uniquely factored as the product of an orthogonal matrix and a symmetric positive definite matrix, that is called a polar decomposition that every real positive-definite symmetric matrix is a product of a lower-triangular matrix and its transpose (Cholesky decomposition).

Embodiments apply these mathematical facts in a specific manner to solve the technical problem of correcting Euler angle misalignment of sensors without hardware modifications. With the method inaccuracy resulting from Euler angle misalignment are minimized and the resulting transfer functions are made feasible to obtain accurate transfer functions by assembly by method of FBS of module transfer functions to a complete component transfer function.

An embodiment provides a method according to the above description, with the additional step of: g. repeating steps c.-f. to further improve symmetry of the main transfer-function matrix (MTM) until a predefined criterium (CRT) is met.

The repetition of selecting a submatrix and symmetry improvement may add additional accuracy to the transfer-function matrix (MTM) for example when being inverted during assembly of several transfer-functions of each module to obtain a component transfer-functions. Another embodiment provides a method according to the above description, wherein step c of selecting a submatrix (SBM) during at least the first run is selecting a submatrix with their diagonal along the diagonal of the main transfer-function matrix (MTM). This selection strategy is efficient since the resulting process is stable and the accuracy improvement is reliable.

Another embodiment provides a method according to the above description, where step c of selecting a submatrix (SBM) is selecting first submatrices with their diagonal along the diagonal of the main transfer-function matrix (MTM) until the diagonal of the main transfer-function matrix (MTM) is at least completely selected once. This option makes use of more degrees of freedom to improve accuracy.

Another embodiment provides a method according to the above description, where step c of selecting a submatrix (SBM) first is selecting submatrices with their diagonal not along the diagonal of the main transfer-function matrix (MTM). This method may be a fast option, wherein these 'mixed' degree of freedom matrix components may improve the overall accuracy of the transfer function regarding the degrees of freedom involved in such submatrix selection within one symmetry improvement step.

The first set of sensors may be measuring a force-parameter, preferably include or consist of at least one of a piezoelectric sensor or strain-gauge sensor or the like.

The second set of sensors may be measuring vibration (for example 3 degree of freedom vibrational responses) and may include or consist of at least one of ceramic piezoelectric sensor, an accelerometer, an optical vibrometer or the like. The accelerometer may be a sensor that measures the dynamic acceleration of a physical device as a voltage. Using optical laser probes may be advantageous when having light structure devices or in case of problems physically contacting the device.

One important understanding is that the misalignment of the Euler angles of the exciters and sensors (shaker, accelerometer, etc.) poses a significant threat to the overall quality of the FRFs and an even more significant problem for the accuracy of the FBS-synthesized FRFs. The embodiments determined that one reason for the sensitivity may lie in an error amplification effect like that a 5% of error in a single module FRF, e.g., a tire FRF, may result in more than 10% change in a two-module-component FRF based on the coupling of e.g., two module FRFs. Consequently, Euler angle alignment requires a higher order of accuracy that implies that even the most experienced engineers cannot satisfy sensor alignment accuracy requirements to obtain FRFs accurate enough for FBS-synthesis.

The field of application for various embodiments may be structural coupling through FBS. The termination used often in this document refers to transfer functions. These transfer functions may be frequency response functions that is considered the more specific term. Modal analysis may be an additional field that might benefit from the technology described herewith.

Embodiments may be used when determining a transfer function respectively a frequency response function of a component including several modules by frequency based substructuring. In the component at least two modules are combined, including the steps of: determining a transfer function of a module applying a method according to the preceding description and coupling the obtained transfer functions and generating a component transfer function respectively frequency response function.

The method steps or sets of method steps may be performed repeatedly in a recursive manner (successive results respectively are based on at least the preceding result) to improve accuracy of the results.

Further embodiments provide a computer implemented method of generating a component including the method according to the preceding description. The method preferably may include: defining a should-state of a transfer function of the component, selecting at least one design parameter of a module of the component to be changed to influence the transfer function of the component, performing and/or repeating the following process steps (I).-(IV). for the selected design parameter(s) until the transfer function of the component complies with the should-state:

(I). selecting one of the selected design parameter(s), (II). performing the method of determining a transfer function of a component by frequency based substructuring, (III). changing the selected design parameter and performing the method of determining a transfer function of a component by frequency based substructuring with the changed design parameter, (IV). comparing the transfer functions of the component before and after changing the design parameter, generating the component with changed design parameters.

Further, embodiments provide to a computer-system configured to carrying out a method of the above defined type.

Further, embodiments provide to a computer-readable medium encoded with executable instructions, that when executed, cause the above referenced computer system to carry out a method described herein.

A computer-implemented method is one which involves the use of a computer, computer network or other programmable apparatus, where one or more features are realized wholly or partly by a computer program. Every method step h may be understood in light of the description by a person with ordinary skill in the art to be done as a computer-implemented step may be considered as a computer-implemented step of the method. The computer-implemented method may contain some steps to be done without the computer.

DETAILED DESCRIPTION

Figures 1, 1A, 1B:
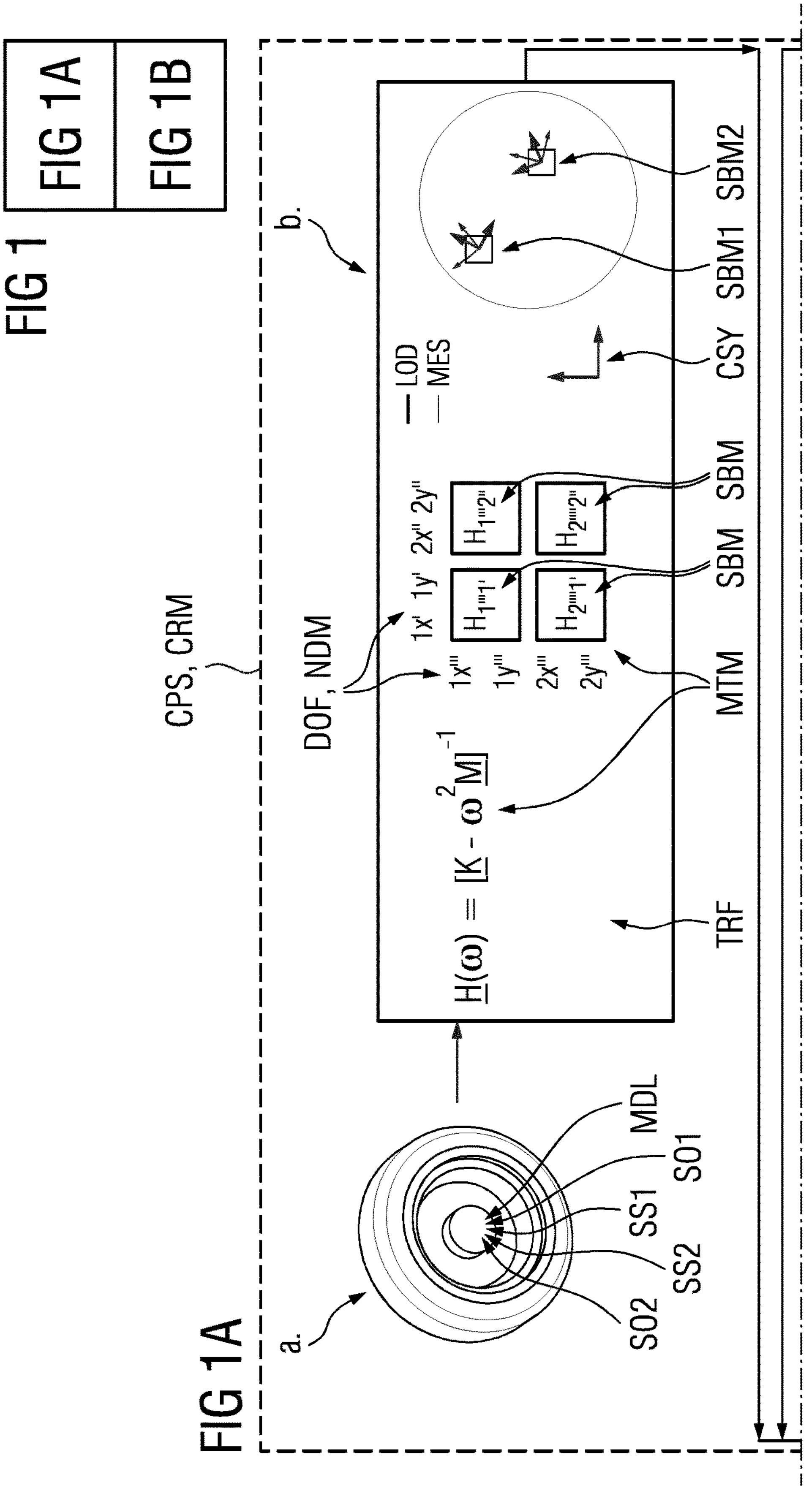
FIG. 1 depicts a schematic diagram of the method-steps the system according to an embodiment.
Figure 1B:
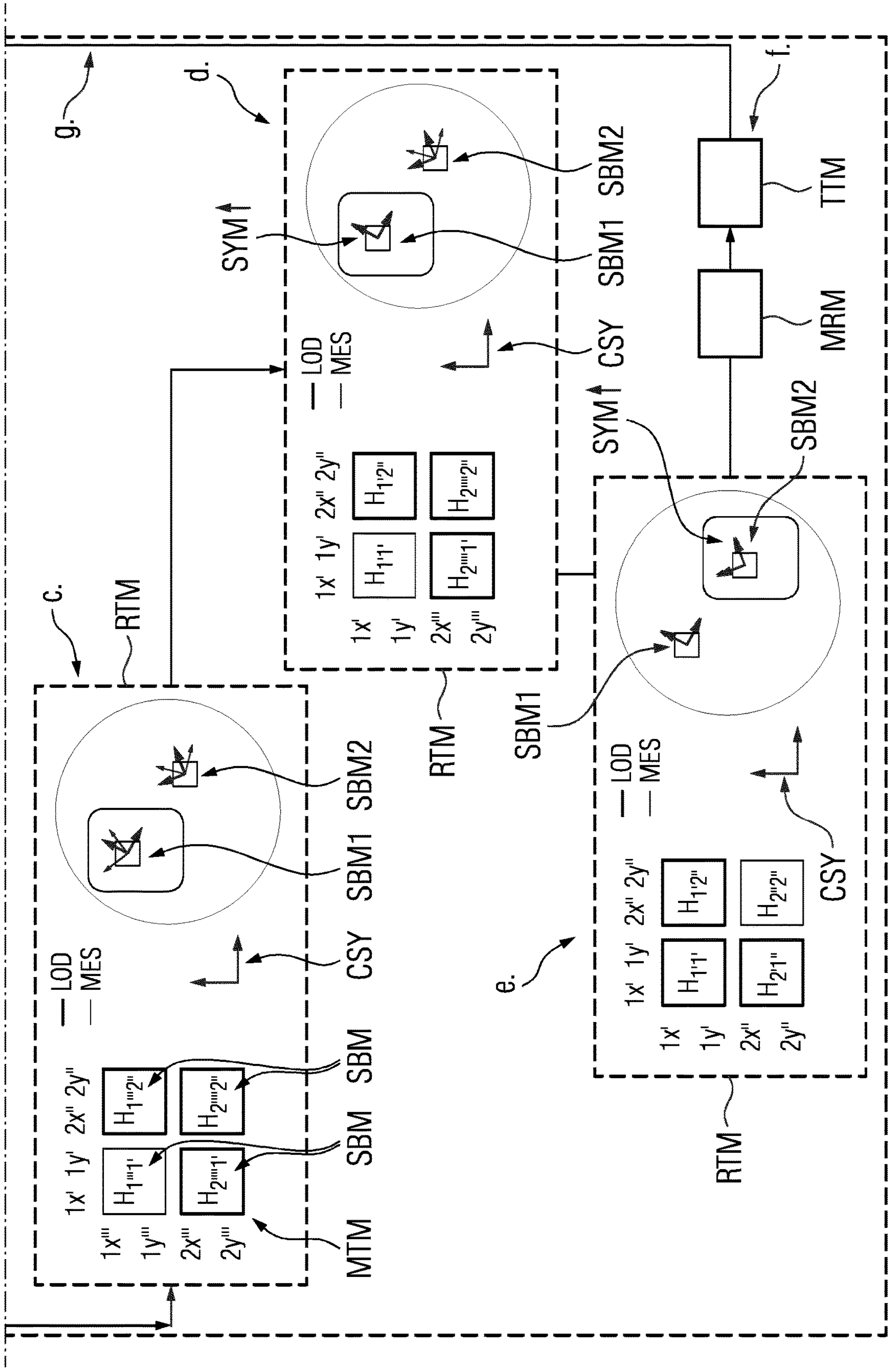

FIG. 1 depicts a schematic illustration of the method-steps as well as a computer-system CPS and a computer readable medium CRM encoded with executable instructions, that when executed, cause the computer system CPS to carry out a method. The computer system CPS may be a personal computer, a computer network including computational resources or a mobile device or similar device.

FIG. 1 depicts the computer system CPS carrying out the computer implemented method of determining a transfer function TRF of a module MDL including the steps: a) measuring a first set-of-sensors-output SO1 using a first set-of-sensors SS1 applied to the module MDL and measuring a second set-of-sensors-output SO2 using a second set-of-sensors SS2 applied to the module MDL, b) deducing a transfer function TRF with a main transfer-function matrix MTM of the module MDL on basis of the set-of-sensors-outputs SO2, SO1, wherein the transfer-function matrix MTM is a quadratic n-dimensional matrix for the n degrees of freedom DOF, wherein each degree of freedom DOF is assigned to a specific one of the n dimensions NDM, c) selecting a submatrix SBM either as the complete main transfer-function matrix MTM or subdividing the transfer-function matrix TRM in at least two submatrices SBM each being assigned to a specific range of the degrees of freedom DOF and selecting one of these submatrices SBM (CSY illustrates a global coordinate system, wherein for each submatrix SBM (e.g. SBM1, SBM2) load (LOD) and measurement (MES) coordinate systems are illustrated, which are first misaligned to each other and afterwards aligned to each other as an effect of the method), d) determining for the selected submatrix SBM a corresponding rotational matrix RTM which improves the symmetry SYM of the submatrix SBM, e) generating a main rotational matrix MRM to transform the main transfer-function matrix MTM, wherein the main rotational matrix MRM includes the rotational matrix RTM such that the range of the degrees of freedom DOF of the respective submatrix SBM corresponds to the rotational submatrix RTM and transforms the corresponding degrees of freedom DOF in the main transfer-function matrix MTM into a transformed transfer-function matrix TTM, and f) providing the transfer function TRF with the transformed transfer-function matrix TTM substituting the main transfer-function matrix MTM.

As a step g. the steps c.-f. may be repeated to further improve symmetry of the main transfer-function matrix MTM until a predefined criterium CRT is met.

During step c of selecting a submatrix SBM at least during the first run a submatrix SBM may be selected with their diagonal along the diagonal of the main transfer-function matrix MTM. The step-c-selection of selecting a submatrix SBM along the diagonal of the main transfer-function matrix MTM may be continued until the diagonal of the main transfer-function matrix MTM is at least completely selected once.

Alternatively step c may be first selecting a submatrix SBM which's diagonal does not belong to the diagonal of the main transfer-function matrix MTM.

Figure 2:
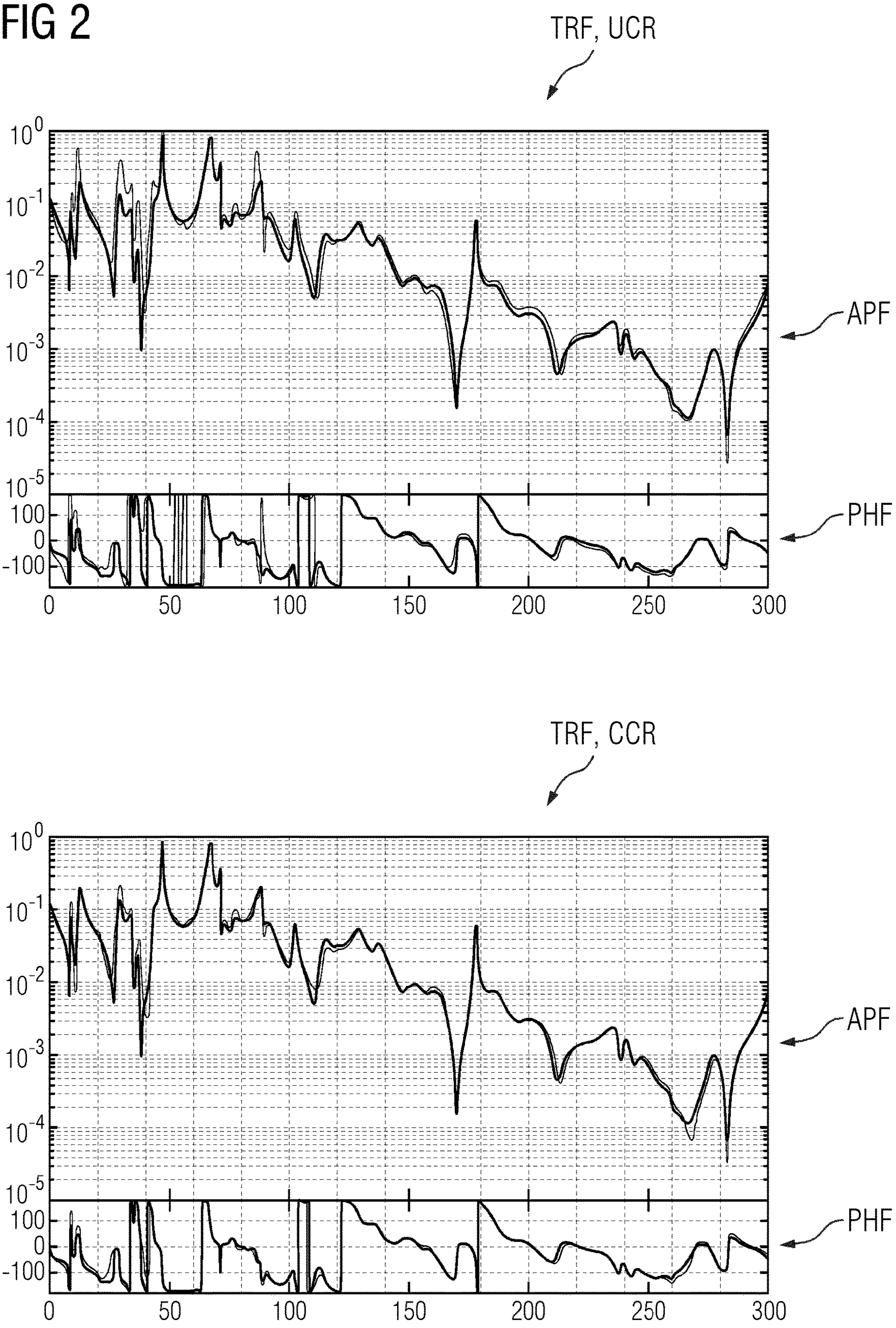
FIG. 2 depicts a comparison of diagrams of an uncorrected transfer function and corrected transfer function (respectively level and phase) according to an embodiment.

FIG. 2 depicts the uncorrected UCR transfer function TRF in the upper part and the corrected CCR transfer function TRF (both being a frequency response function FRF) in the lower part respectively, an amplitude-function APF and the phase-function PHF of the frequency. The corrected transfer function TRF shows a smaller deviation between the measurements of the single sensors.

Figure 3:
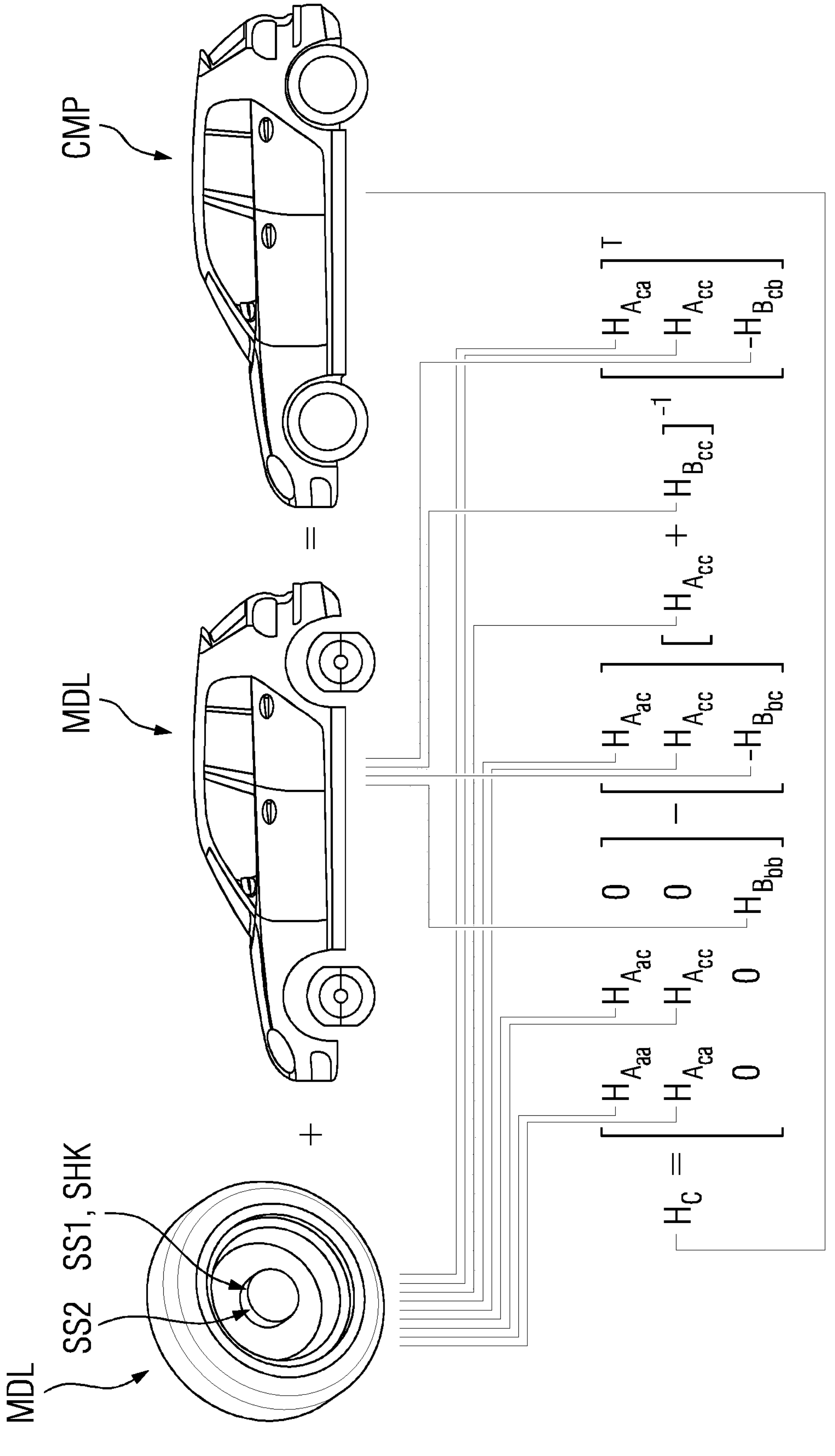
FIG. 3 depicts schematically Frequency Based Substructuring (FBS) according to an embodiment.

FIG. 3 depicts schematically Frequency Based Substructuring (FBS) combining two modules MDL (four tires=first module MDL, the rest of the vehicle without tires=second module MDL) to result in the complete component CMP. The first module MDL respectively the tires are equipped with the second set of sensors SS2, and a shaker SHK (shaker may preferably be located around the tire wheel center) includes a first set of sensors SS1. For example, the second set of sensors may include nine accelerometers to monitor the vibrations caused by the shaker SHK. Since the tire center does physically not exist due to the hole for the vehicle-axle the sensors of the second set of sensors SS2 are normally arranged around the hole. The second module MDL of the component CMP may be equipped with sensor sets, too, and the method may be applied there as well. The overall transfer function TRF is a frequency response function FRF and may be obtained by combining the two transfer functions TRF of the modules MDL involved, as depicts below the pictures of the vehicle respectively the tire as an equation of matrices. The contributions of the single transfer functions TRF of the respective modules MDL to the transfer function TRF of the complete component CMD is indicated by lines drawn between the respective module MDL and the matrix equation elements below the pictures (tire parameters are indicated by subscripted 'A', rest-vehicle parameters are indicated by subscripted 'B', component parameters are indicated by subscripted 'C'). When combining the single transfer functions TRF it becomes necessary to make a matrix inversion (circled term) which leads to error-amplification. If the single transfer functions TRF of the modules MDL to be combined are not sufficiently accurate, the error amplification may lead to inacceptable results. In this context the correct Euler angle alignment is essential, and the correction introduced of high importance.

An effect of the method is a correction of the Euler angles Θ of the sensors of the sensor sets SS1, SS2 that may not be aligned identically during measurement. This misalignment may affect the transfer functions of the respective modules since excitation and response do not harmonize to each other. A frequency based substructuring approach which requires matrix inversion conventionally amplifies the misalignment problems. The method repairs this issue and enables good accuracy of assembled transfer functions of components made from module transfer functions.

Figures 4, 4A, 4B, 4C, 4D:
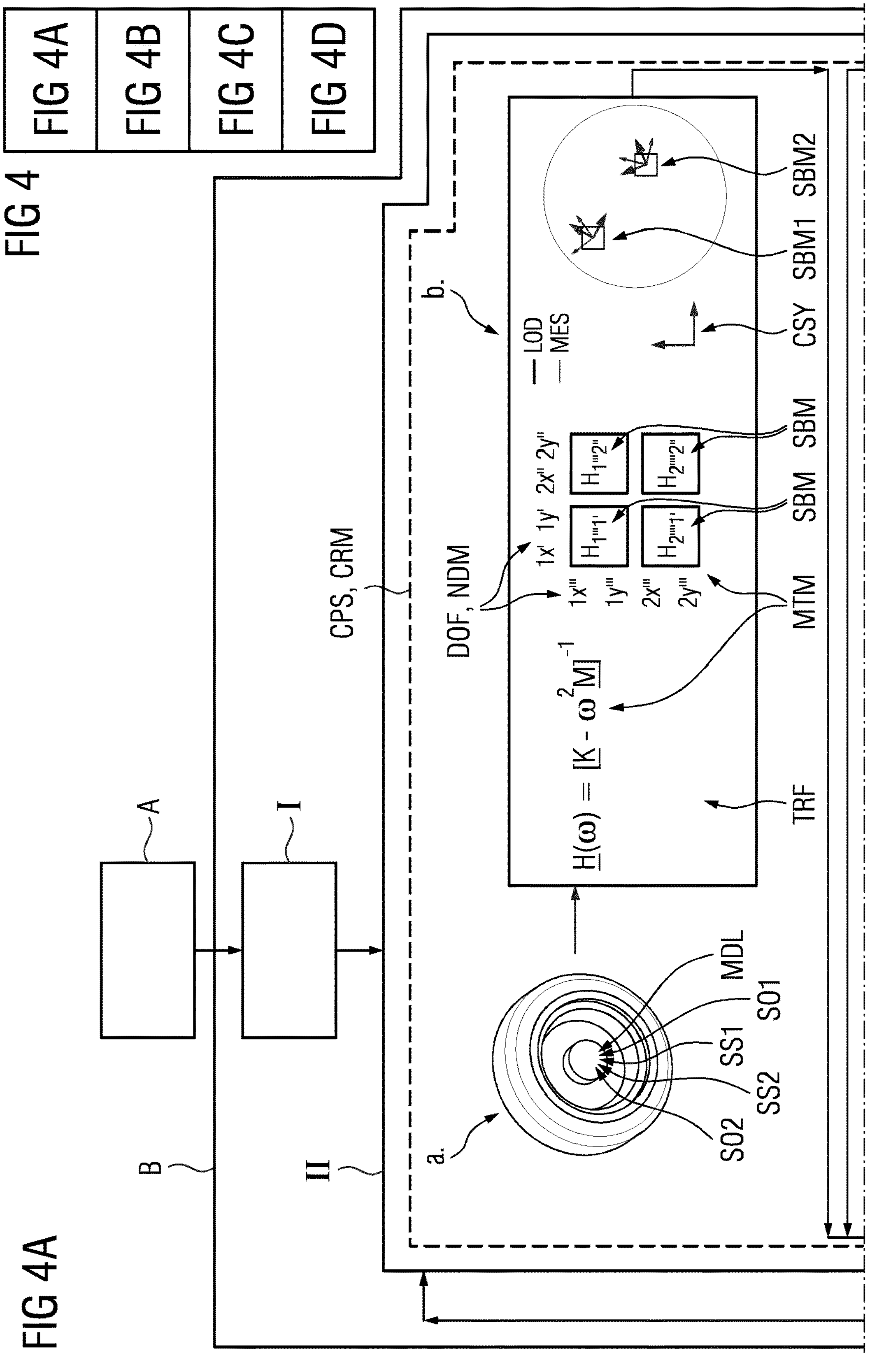
FIG. 4 depicts schematically a method of generating a component according to an embodiment.
Figure 4B:
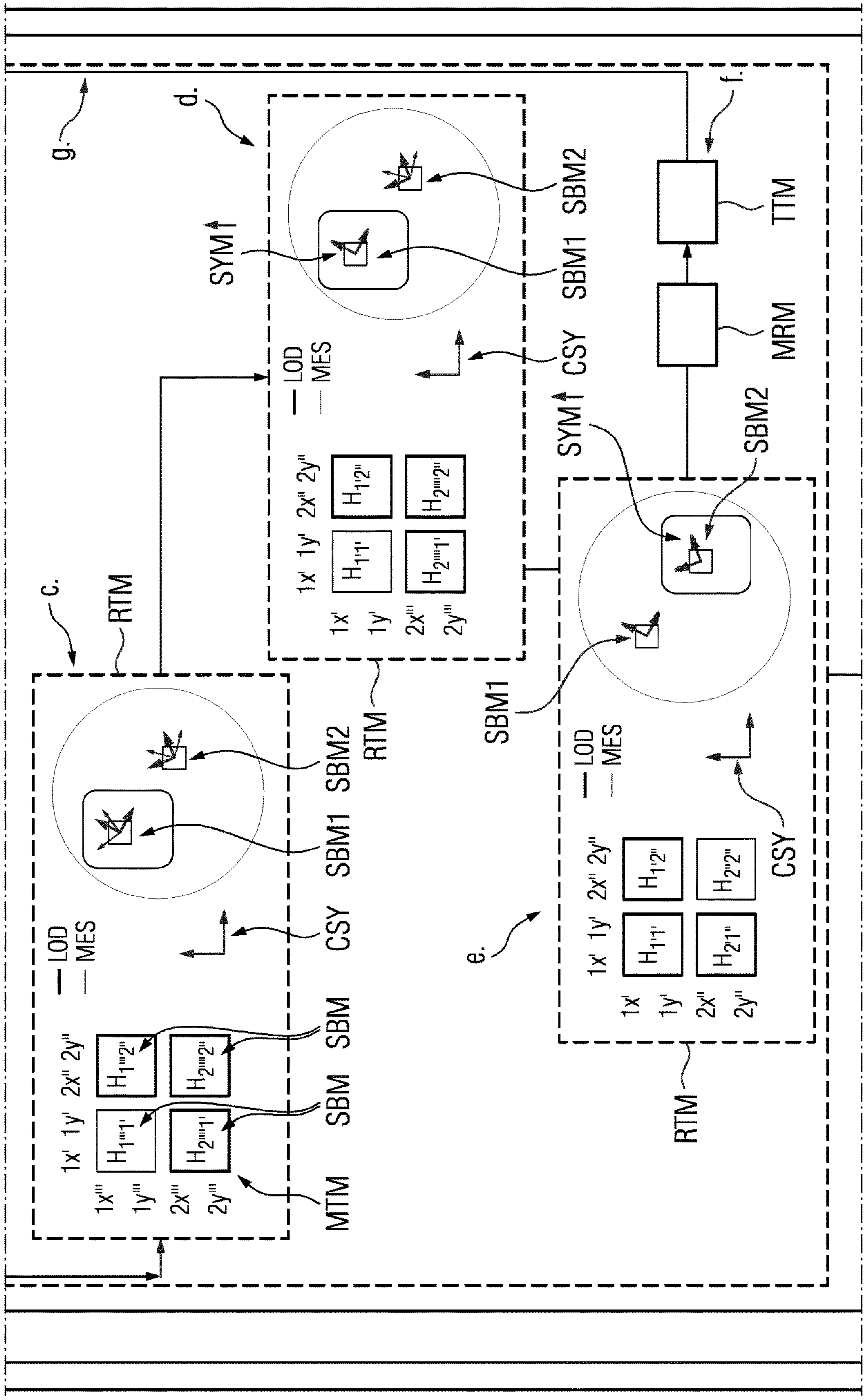
Figure 4C:
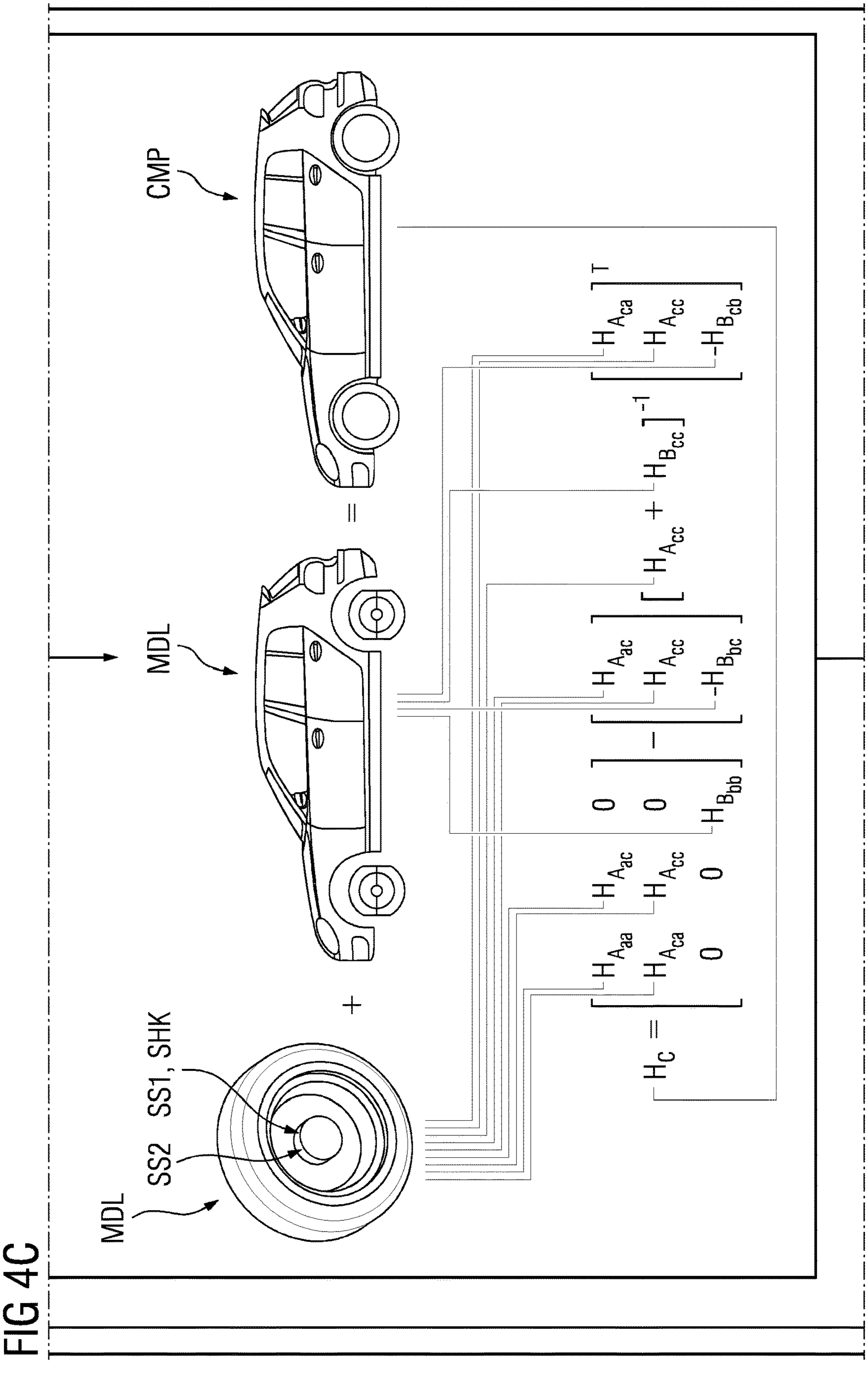
Figure 4D:
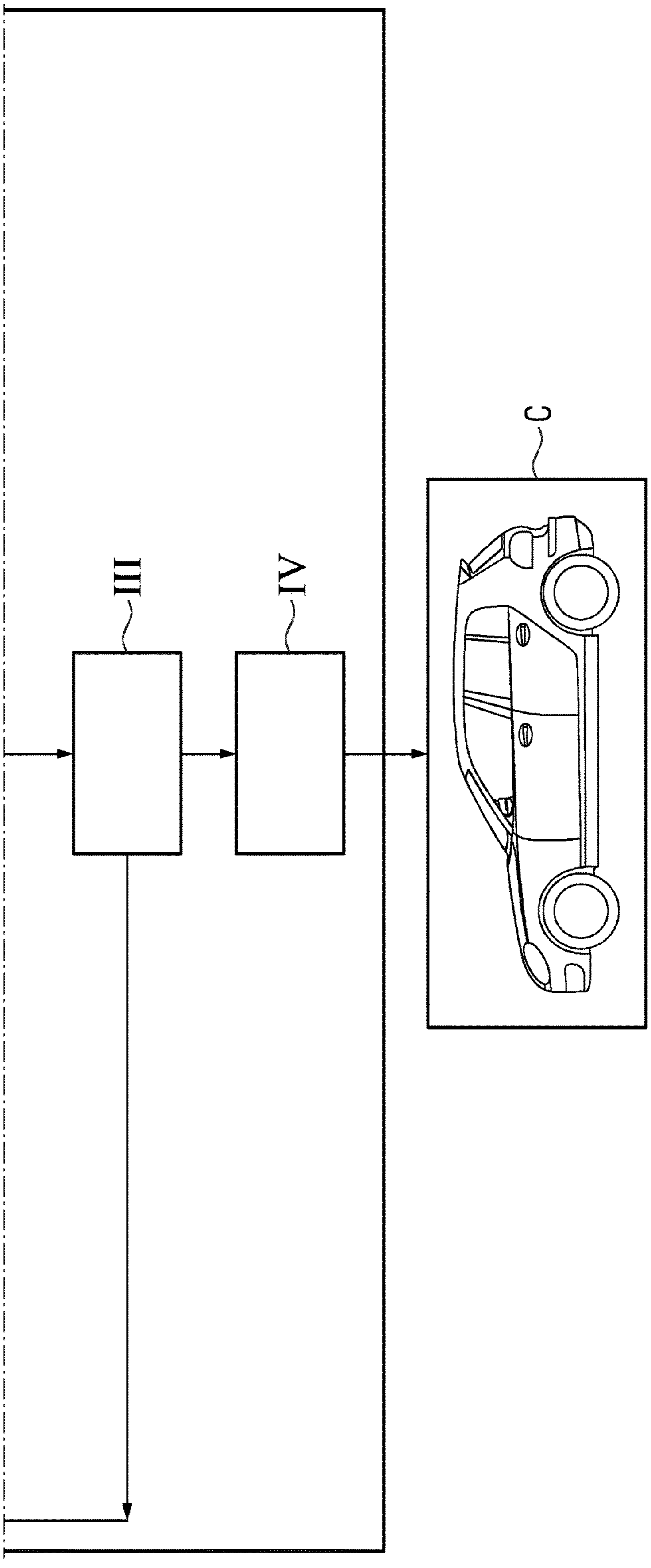

FIG. 4 schematically illustrates a computer implemented method of generating a component CMP. Initially a should-state of a transfer function of the component may be defined, like low noise in a vehicles compartment when driving along a specific road paving roughness.

In a step A. at least one design parameter of a module MDL of the component CMP to be changed to influence the transfer function of the component CMP is selected.

During step B. the following process steps (I).-(IV) are performed or repeated for the selected design parameter(s) until the transfer function of the component CMP complies with the predefined should-state:

(I). selecting one of the selected design parameter(s), (II). performing the method respectively according to FIG. 1, (III). changing the selected design parameter and performing the method respectively according to FIG. 1 with the changed design parameter, (IV). comparing the transfer functions of the component CMP before and after changing the design parameter.

During a final step C. the component with changed design parameters is generated.

It is to be understood that the elements and features recited in the appended claims may be combined in different ways to produce new claims that likewise fall within the scope of the present embodiments. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present embodiments have been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A computer implemented method of determining a transfer function of a component by frequency based substructuring and generating the component, wherein in the component at least two modules are combined, the method comprising:

determining a transfer function of a module of n degrees of freedom comprising:

measuring a first set-of-sensors-output using a first set-of-sensors applied to the module and measuring a second set-of-sensors-output using a second set-of-sensors applied to the module, wherein the measuring addresses Euler angle misalignment between sensors without requiring hardware sensor realignment;

deducing the transfer function with a main transfer-function matrix of the module on basis of the set-of-sensors-output, wherein the transfer-function matrix is a quadratic n-dimensional matrix for the n degrees of freedom, wherein each degree of freedom is assigned to a specific one of the n dimensions;

selecting a submatrix either as the complete main transfer-function matrix or subdividing the transfer-function matrix in at least two submatrices each being assigned to a specific range of the degrees of freedom and selecting one of at least two submatrices;

determining for the selected submatrix a corresponding rotational matrix which computationally corrects physical Euler angle misalignment between the first set-of-sensors and the second set-of-sensors by reducing non-reciprocal terms in the submatrix to make the submatrix closer to being equal to a transpose of the submatrix;

generating a main rotational matrix to transform the main transfer-function matrix, wherein the main rotational matrix comprises the rotational matrix such that the range of the degrees of freedom of the respective submatrix corresponds to the rotational submatrix and transforms the corresponding degrees of freedom in the main transfer-function matrix into a transformed transfer-function matrix;

providing the transfer function with the transformed transfer-function matrix substituting the main transfer-function matrix; and coupling transfer functions of the modules of the component utilizing the computationally aligned sensor data to obtain a component transfer function with reduced error amplification effects during the frequency based substructuring.

2. The computer implemented Method of claim 1, further comprising:

repeating selecting, determining, generating, and providing to further reduce non-reciprocal terms in the main transfer-function matrix until a predefined criterium is met.

3. The computer implemented Method of claim 2, wherein selecting a submatrix during at least a first run comprises selecting a submatrix with a diagonal along a diagonal of the main transfer-function matrix.

4. The computer implemented Method of claim 3, wherein selecting a submatrix comprises selecting first submatrices with their diagonal along the diagonal of the main transfer-function matrix until the diagonal of the main transfer-function matrix is at least completely selected once.

5. The computer implemented Method of claim 1, wherein selecting a submatrix first comprises selecting submatrices with their diagonal not along the diagonal of the main transfer-function matrix.

6. The computer implemented Method of claim 1, wherein the second set-of-sensors comprises vibration sensors and wherein the second set-of-sensors-output comprises vibration characteristics.

7. The computer implemented Method of claim 1, wherein the first set-of-sensors comprises force sensors and wherein the first set-of-sensors-output comprises excitation force characteristics.

8. The computer implemented Method of claim 1, wherein the transfer function is a frequency response function.

9. A Computer implemented method of generating a component the method comprising:

defining a should-state of a transfer function of the component;

selecting at least one design parameter of a module of the component to be changed to influence the transfer function of the component;

performing and/or repeating the following process steps for the selected design parameter(s) until the transfer function of the component complies with the should-state:

selecting one of the selected design parameter(s), determining the transfer function of the module of n degrees of freedom comprising:

measuring a first set-of-sensors-output using a first set-of-sensors applied to the module and measuring a second set-of-sensors-output using a second set-of-sensors applied to the module, wherein the measuring addresses Euler angle misalignment between sensors without requiring hardware sensor realignment;

deducing the transfer function with a main transfer-function matrix of the module on basis of the set-of-sensors-output, wherein the transfer-function matrix is a quadratic n-dimensional matrix for the n degrees of freedom, wherein each degree of freedom is assigned to a specific one of the n dimensions;

selecting a submatrix either as the complete main transfer-function matrix or subdividing the transfer-function matrix in at least two submatrices each being assigned to a specific range of the degrees of freedom and selecting one of at least two submatrices;

determining for the selected submatrix a corresponding rotational matrix reduces non-reciprocal terms in the submatrix to make the submatrix more symmetric by making it closer to being equal to its transpose;

generating a main rotational matrix to transform the main transfer-function matrix, wherein the main rotational matrix comprises the rotational matrix such that the range of the degrees of freedom of the respective submatrix corresponds to the rotational submatrix and transforms the corresponding degrees of freedom in the main transfer-function matrix into a transformed transfer-function matrix;

providing the transfer function with the transformed transfer-function matrix substituting the main transfer-function matrix;

changing the selected design parameter and determining a new transfer function by repeating measuring, deducing, selecting, determining, generating, and providing with the changed design parameter, comparing the transfer functions of the component before and after changing the selected design parameter; and generating the component with changed design parameters.

10. A non-transitory computer implemented storage medium that stores machine-readable instructions executable by at least one processor for determining a transfer function of a component by frequency based substructuring, wherein in the component at least two modules are combined, the machine-readable instructions comprising:

determining a transfer function of a module of n degrees of freedom comprising:

measuring a first set-of-sensors-output using a first set-of-sensors applied to the module and measuring a second set-of-sensors-output using a second set-of-sensors applied to the module;

deducing the transfer function with a main transfer-function matrix of the module on basis of the set-of-sensors-output, wherein the transfer-function matrix is a quadratic n-dimensional matrix for the n degrees of freedom, wherein each degree of freedom is assigned to a specific one of the n dimensions;

selecting a submatrix either as the complete main transfer-function matrix or subdividing the transfer-function matrix in at least two submatrices each being assigned to a specific range of the degrees of freedom and selecting one of at least two submatrices;

determining for the selected submatrix a corresponding rotational matrix which computationally corrects physical Euler angle misalignment between the first set-of-sensors and the second set-of-sensors by reducing non-reciprocal terms in the submatrix to make the submatrix closer to being equal to a transpose of the submatrix;

generating a main rotational matrix to transform the main transfer-function matrix, wherein the main rotational matrix comprises the rotational matrix such that the range of the degrees of freedom of the respective submatrix corresponds to the rotational submatrix and transforms the corresponding degrees of freedom in the main transfer-function matrix into a transformed transfer-function matrix;

providing the transfer function with the transformed transfer-function matrix substituting the main transfer-function matrix to provide computationally aligned sensor data without physical hardware sensor realignment; and coupling transfer functions of the modules of the component utilizing the computationally aligned sensor data to obtain a component transfer function with reduced error amplification effects during the frequency based substructuring.

* * * * *